United States Patent
Haess et al.

(10) Patent No.: US 11,175,921 B2
(45) Date of Patent: Nov. 16, 2021

(54) COGNITIVE BINARY CODED DECIMAL TO BINARY NUMBER CONVERSION HARDWARE FOR EVALUATING A PREFERRED INSTRUCTION VARIANT BASED ON FEEDBACK

(71) Applicant: International Business Machines Corporation, Armonk, NY (US)

(72) Inventors: Juergen Haess, Schoenaich (DE); Cedric Lichtenau, Stuttgart (DE); Stefan Payer, Stuttgart (DE); Kerstin C. Schelm, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 292 days.

(21) Appl. No.: 15/980,333

(22) Filed: May 15, 2018

(65) Prior Publication Data

US 2019/0354373 A1 Nov. 21, 2019

(51) Int. Cl.
*G06F 9/30* (2018.01)
*G06F 9/38* (2018.01)

(52) U.S. Cl.
CPC ........ *G06F 9/3836* (2013.01); *G06F 9/30181* (2013.01)

(58) Field of Classification Search
CPC ............... G06F 9/3001; G06F 9/30014; G06F 9/30025; G06F 9/30181; G06F 9/3836; G06F 9/3861; G06F 1/3243
See application file for complete search history.

(56) References Cited

U.S. PATENT DOCUMENTS

| | | | |
|---|---|---|---|
| 5,386,375 A | * | 1/1995 | Smith ................... G06F 7/5525 708/500 |
| 7,937,568 B2 | | 5/2011 | Correale, Jr. et al. |
| 8,868,888 B2 | | 10/2014 | Ingle et al. |
| 9,317,288 B2 | | 4/2016 | Henry et al. |
| 9,606,797 B2 | | 3/2017 | Vaidya et al. |
| 10,146,545 B2 | * | 12/2018 | Segelken ............ G06F 9/30174 |
| 2012/0215825 A1 | * | 8/2012 | Mavalankar .......... G06F 7/5443 708/551 |
| 2015/0227372 A1 | * | 8/2015 | Henry ................. G06F 9/30145 714/23 |

(Continued)

OTHER PUBLICATIONS

Gautschi et al., "Tailoring instruction-set extensions for an ultra-low power tightly-coupled cluster of OpenRISC cores", Abstract, IEEE, Nov. 2, 2015, 6 pages.

*Primary Examiner* — David J. Huisman
(74) *Attorney, Agent, or Firm* — Cantor Colburn LLP; Steven Chiu

(57) ABSTRACT

A method is provided. The method is executable by a processor. The method includes receiving, by an instruction issue unit of the processor as an input, a preferred instruction variant from an instruction variant selection logic. The method includes executing, by an execution unit of the processor, the preferred instruction variant. The method includes providing, by the execution unit of the processor, quality feedback to the instruction variant selection logic and evaluating, by the instruction variant selection logic of the processor, the preferred instruction variant based on the quality feedback.

18 Claims, 4 Drawing Sheets

(56) References Cited

U.S. PATENT DOCUMENTS

2016/0041813 A1* 2/2016 Narayanamoorthy .. G06F 7/523
708/190
2017/0286117 A1* 10/2017 Mohapatra .......... G06F 9/30123
2018/0253304 A1* 9/2018 Gschwind ........... G06F 9/30018

* cited by examiner

COGNITIVE BINARY CODED DECIMAL TO BINARY NUMBER CONVERSION HARDWARE FOR EVALUATING A PREFERRED INSTRUCTION VARIANT BASED ON FEEDBACK

BACKGROUND

The disclosure relates generally to cognitive binary coded decimal (BCD) to binary number conversion hardware.

In general, contemporary microprocessor designs include hardware to convert binary coded decimal (BCD) numbers to binary number format, where four bits of a BCD are representing a digit of a decimal number. For example, values 0b0000 to 0b1001 of a digit are numbers 0 to 9 and all other values are illegal. Further, the contemporary microprocessor designs convert n=3 digits of a BCD to binary at the same time in step i and adds them to the results from step i-1. A duration to convert a BCD number with this iterative approach depends on a number of digits to be converted. In turn, having input data with a width of 64 bits, means 4 bits are reserved for the sign and 60 bits are digits. So 60 bits/4 bits=15 digits can be converted. Converting 3 digits at one step in parallel, means 5 iterations have to be done.

In addition, the contemporary microprocessor designs require the processor to calculate the correct result in case of an overflow. So, when there are more input digits than a range of the resulting binary number is capable of holding, the result may be correct for the bits to provide while the remaining bits are cut.

SUMMARY

According to one of more embodiments, a method is provided. The method is executable by a processor. The method includes receiving, by an instruction issue unit of the processor as an input, a preferred instruction variant from an instruction variant selection logic. The method includes executing, by an execution unit of the processor, the preferred instruction variant. The method includes providing, by the execution unit of the processor, a quality feedback to the instruction variant selection logic and evaluating, by the instruction variant selection logic of the processor, the preferred instruction variant correct based on the quality feedback. The method embodiments herein can be implemented as system and/or computer program product embodiments.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

In view of the above, embodiments disclosed herein may include a system, a method, and/or a computer program product (herein system) that performs a smaller convert on a lower range of digits (assuming only zeros are in a higher range) instead of always executing a full convert on a whole range. For instance, as the system speeds up executed instructions dynamically based on learning information, the system runs/executes a shorter convert operation instead of a long convert operation for the whole range of a number. Technical effects and benefits of assuming only zeros are in the higher range speed up the operation and, in turn, the processor. Thus, embodiments described herein are necessarily rooted in one or more processors of the system to perform proactive operations to overcome problems specifically arising in the realm of microprocessor designs (e.g., these problems include blocking by multicycle instructions in the pipeline in an execution unit for a fixed amount of cycles and/or instructions ending earlier for iterative algorithms depending on the kind of workload and data, resulting in unwanted processor costs and expenses).

Figure 1:
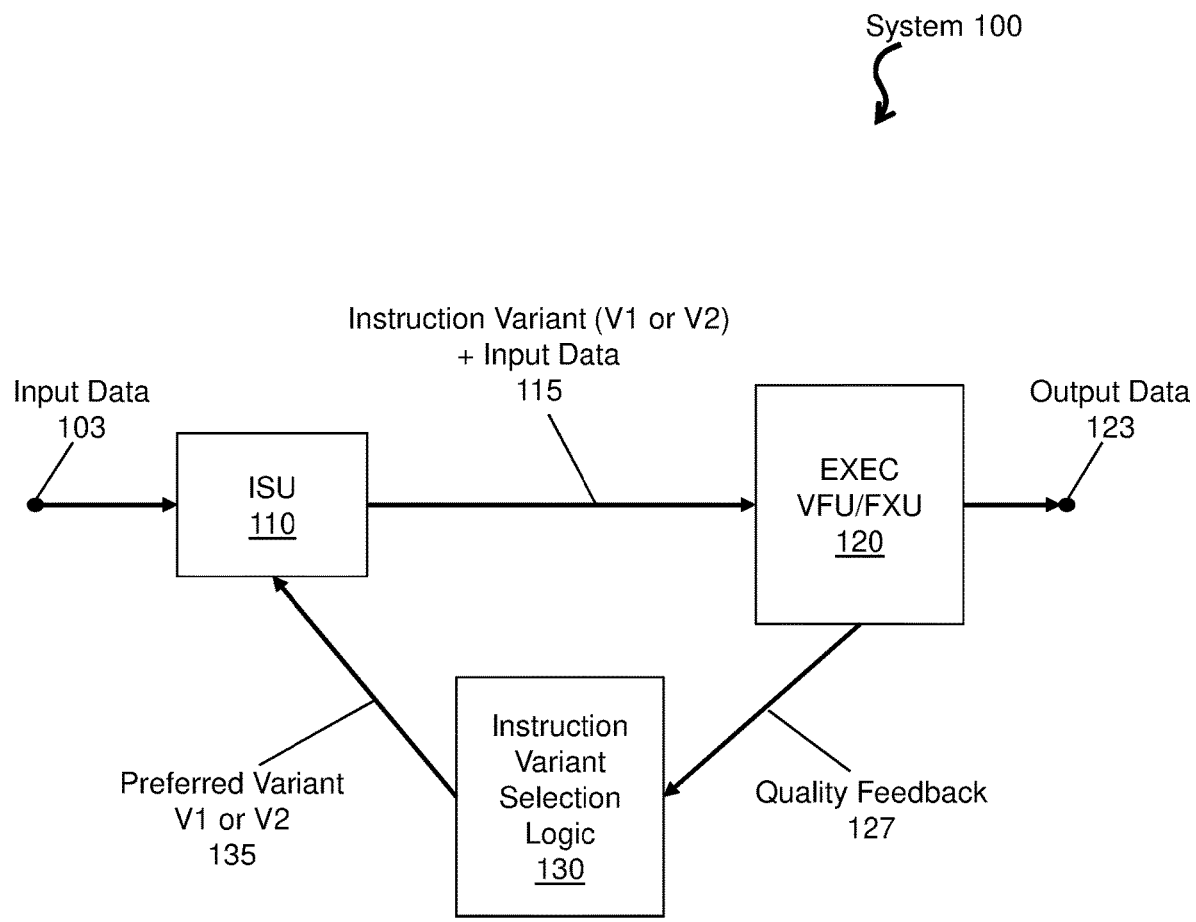
FIG. 1 depicts a schematic of a system in accordance with one or more embodiments.

Turning now to FIG. 1, a schematic of a system 100 is depicted in accordance with one or more embodiments. The system 100 can be an electronic, computer framework comprising and/or employing any number and combination of central processing units and microprocessors utilizing various communication technologies, as described herein. The system 100 can be easily scalable, extensible, and modular, with the ability to change to different services or reconfigure some features independently of others. The system 100 comprises input data 103, an instruction issue unit (ISU) 110, instruction variant and input data 115, an execution vector floating point and fixed point unit (EXEC VFU/FXU) 120, output data 123, quality feedback 127, an instruction variant selection logic 130, and a preferred variant 135.

The system 100 can assume that in many cases a number to be converted is inside a valid range. In turn, a loop to convert that number can be exited early, since there are only zeros to be added to a result in each step. In the case of a multiply operation example, if the system 100 were to multiply d"1234567890" with d"0000000123" digit-wise, the system 100 could multiply d"1234567890" with d"00123", because of the zeros. The result is achieved with half of a number of iterations if the system 100 were to multiply by one digit per iteration.

When exiting early, the hardware of the system 100 can experience cases where there are nonzero digits in a higher significance digit range. The system 100, therefore, detects this error case and flags it for any controlling hardware. The instruction is then repeated for a full range of digits after this error is detected and flagged. In operation, the system 100 extends an instruction by a bit, forcing the system 100 to convert a full range of digits. If that bit is not set, the system 100 utilizes learning information to determine whether the system 100 has to convert the full range of digits after. The learning information is based on a history of convert operations and weighted by weighting factors.

The ISU 110 is part of a processor (e.g., hardware of the system 100) that issues instructions to the EXEC VFU/FXU 120. The ISU 110 can receive the input data 103 and execute an instruction fetch to procure an instruction variant based on the input data 103. The instruction variant can be predetermined as a preferred variant. The instruction fetch by the ISU 110 can procure one or more instruction variants, such as a preferred variant (e.g., an instruction variant V1) and a second variant (e.g., an instruction variant V2). The ISU 110 then provides the instruction variant (e.g., the fetched preferred variant) and input data 115 to the EXEC VFU/FXU 120.

In accordance with one or more embodiments, there is one instruction visible external to the system 100, while internally there is a differentiation between two or more variants of the instruction (e.g., instruction variant V1 and instruction variant V2). Note, the instruction variant V1 has different execution length/power impact than the instruction variant V2, such as one long variant on a whole range of bits and one small variant on a smaller range of bits, assuming no overflow. In the case of a convert operation instruction example, the system 100 is differentiating between two variants internally depending on a history of variants executed and the feedback (e.g., quality feedback 127).

The EXEC VFU/FXU 120 is part of a processor (e.g., hardware of the system 100) that executes instructions from the ISU 110 (e.g., a convert on the input data 103 is done inside the EXEC VFU/FXU 120). For instance, the EXEC VFU/FXU 120 executes the instruction variant and input data 115 (e.g., based on the preferred variant received from the ISU 110), outputs the output data 123, and outputs the quality feedback 127 to the instruction variant selection logic 130. For example, in a first loop according to one or more embodiments, the EXEC VFU/FXU 120 can utilize the instruction variant V1 and then gives the quality feedback 127 to the instruction variant selection logic 130 to indicate whether the instruction variant V1 was optimal for the input data 103. The quality feedback 127 can include, but is not limited to, whether the preferred instruction variant is correct, last and/or a number of executions times, and the decision about a variant to execute at a current time.

The instruction variant selection logic 130 is part of a processor (e.g., the hardware of the system 100) that sets the preferred variant for the input data 103. As shown in FIG. 1, the instruction variant selection logic 130 learns from the quality feedback 127 and determines whether the instruction variant V1 was optimal for the input data 103. In turn, the instruction variant selection logic 130 informs the ISU 110 which of the instruction variant V1 and the instruction variant V2 should be the preferred variant.

Figure 2:
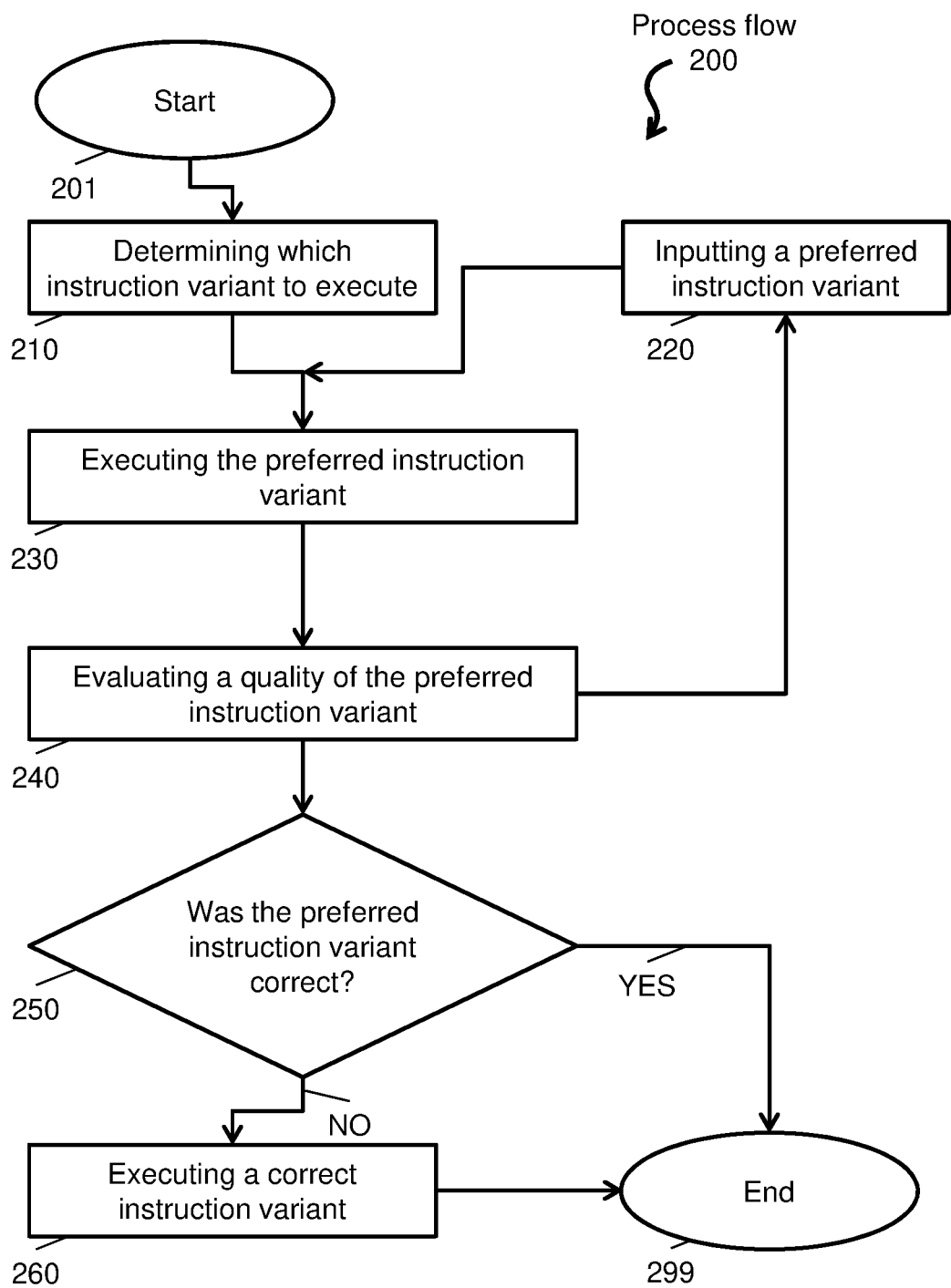
FIG. 2 depicts a process flow in accordance with one or more embodiments.

FIG. 2 depicts a process flow 200 in accordance with one or more embodiments. The process flow 200 is described with respect to the system 100 of FIG. 1. The process flow 200 begins at the start circle 201 (when the ISU 110 gets a trigger to execute the convert operation instruction) and proceeds to block 210. At block 210, the ISU 110 determines which instruction variant to execute. In accordance with one or more embodiments, the ISU 110 issues an instruction to the EXEC VFU/FXU 120 chosen out of n variants of that instruction, where n is an integer greater than or equal to 2. In particular regarding the convert instruction, the ISU 110 chooses between two variants. At block 220, the ISU 110 receives as an input a preferred instruction variant from the instruction variant selection logic 130. At block 230, the EXEC VFU/FXU 120 executes the preferred instruction variant. After the instruction is executed inside the EXEC VFU/FXU 120, the quality feedback 127 is given to the instruction variant selection logic 130.

At block 240, the instruction variant selection logic 130 evaluates a quality of the preferred instruction variant. At decision block 250, the instruction variant selection logic 130 determines whether the preferred instruction variant is correct (that is, whether the quality meets a threshold value).

If the preferred instruction variant is incorrect, the process flow 200 proceeds to block 260 (as indicated by the NO arrow). At block 260, the system 100 executes the correct instruction variant. Then, the process flow 200 concludes at the end circle 299. Returning to decision block 250, if the preferred instruction variant is correct, the process flow 200 concludes at the end circle 299 (as indicated by the YES arrow).

Figure 3:
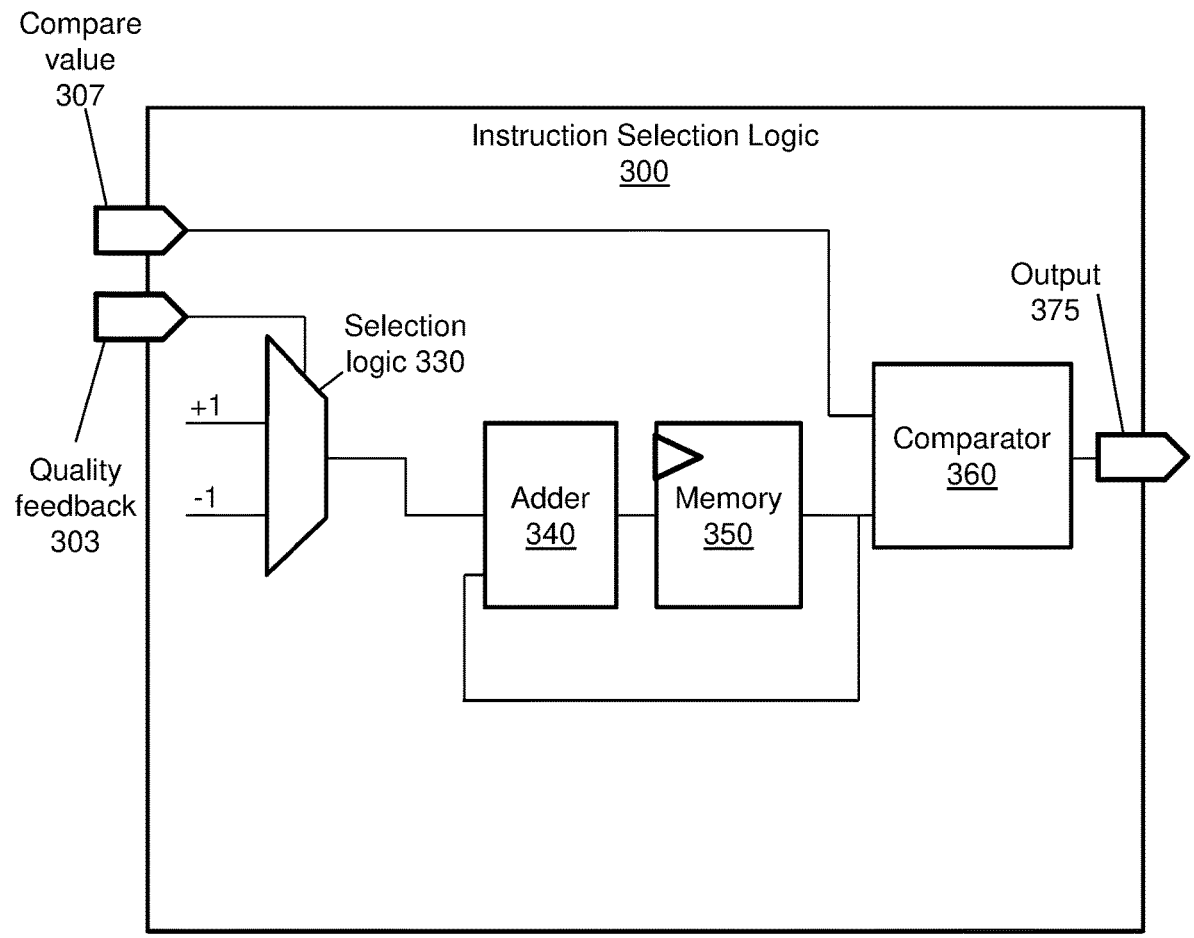
FIG. 3 depicts an instruction selection logic circuit in accordance with one or more embodiments.

FIG. 3 depicts an instruction selection logic circuit 300 in accordance with one or more embodiments. The instruction selection logic circuit 300 comprises quality feedback 303, a compare value 307, a selection logic 330, an adder 340, a memory 350, a comparator 360, and an output 375. A result of the instruction selection logic circuit 300 is a decision regarding which variant of instruction is executed the next time that instruction occurs. The quality feedback 303 (e.g., as quality feedback 127 of FIG. 1) is fed into the matching port of the instruction selection logic circuit 300. Depending on the quality feedback 303, a one ("1") is added to or subtracted from the memory 350. Then an internal state (of the system 100) is compared against the compare value 307 in the comparator 360. Depending on that compare operation, the output 375 selects/defines a preferred instruction variant for the future execution.

Figure 4:
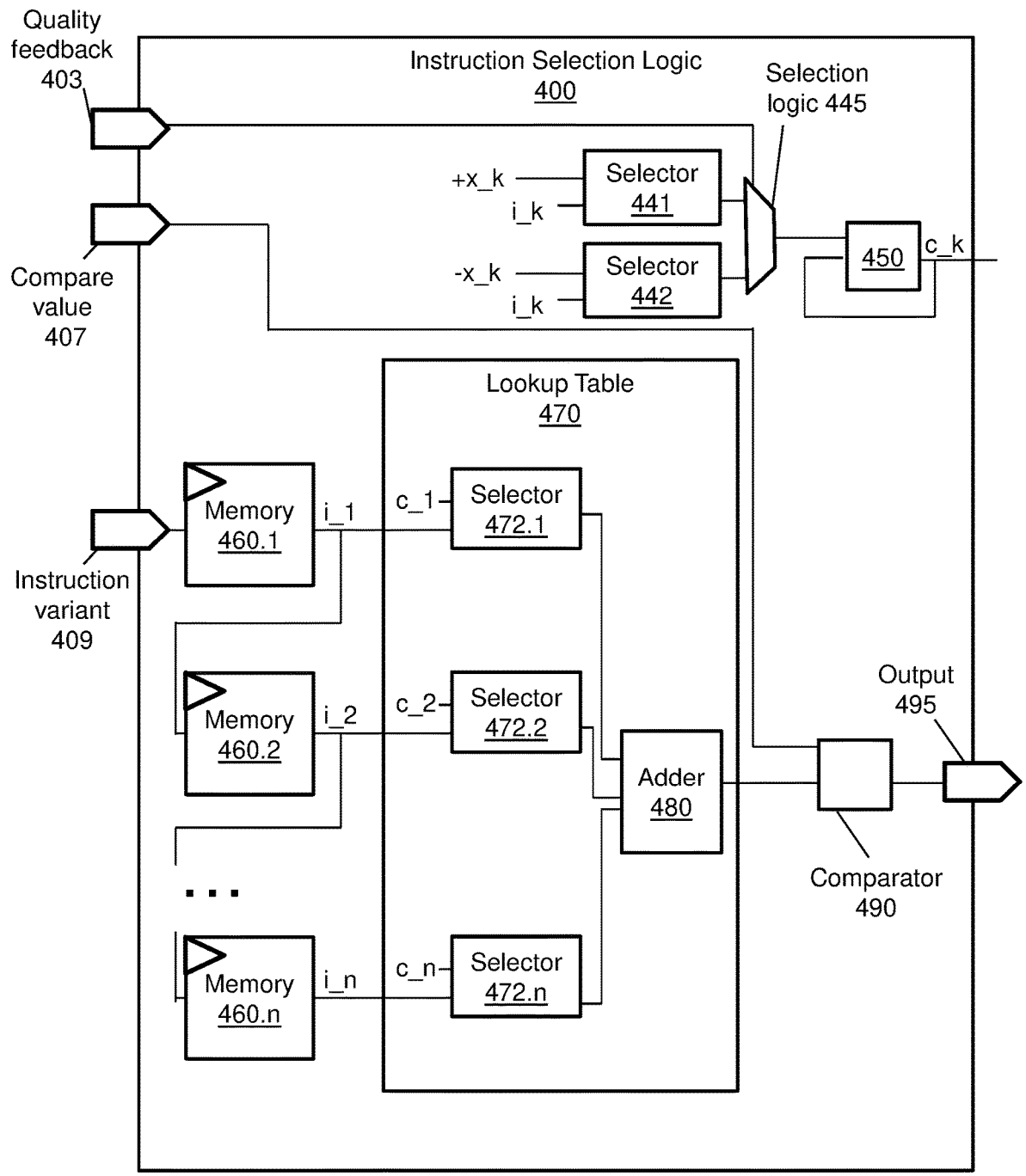
FIG. 4 depicts an instruction selection logic circuit in accordance with one or more embodiments.

FIG. 4 depicts an instruction selection logic circuit 400 in accordance with one or more embodiments. The instruction selection logic circuit 400 comprises quality feedback 403, a compare value 407, an instruction variant 409, selectors 441, 442, a selection logic 445, and an adder 450. The instruction selection logic circuit 400 comprises a memory 460.1 to a memory 460.$n$, where n is an integer greater than 1. The instruction selection logic circuit 400 comprises a lookup table 470, with a selector 472.1 to a selector 472.$n$, where n is an integer greater than 1. The instruction selection logic circuit 400 comprises an adder 480, a comparator 490, and an output 495.

In an operation of instruction selection logic circuit 400 in accordance with one or more embodiments, the instruction selection logic circuit 400 delays the instruction variant 409 (that was selected), weights it with a coefficient $c\_i$ and sums it at the adder 480. Then, the instruction selection logic circuit 400 in accordance with one or more embodiments compares a result from the adder 480 to the compare value 407 at the comparator 490. The instruction selection logic circuit 400 learns by adding or subtracting a step size x times the selected instruction variant to/from the existing coefficient, based on the quality feedback 403 (e.g., utilizing the selectors 441, 442, the selection logic 445, and the adder 450). In this regard, the coefficients are starting with an initial value. Then, during execution of the program code, the coefficients are adapting step by step to the optimal value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, the method executable by a processor, the method comprising:
receiving, by an instruction issue unit of the processor as input, a preferred instruction variant from instruction variant selection logic of the processor;
executing, by an execution unit of the processor, the preferred instruction variant;
providing, by the execution unit of the processor, a quality feedback to the instruction variant selection logic; and
evaluating, by the instruction variant selection logic, a quality of the preferred instruction variant based on the quality feedback.

2. The method of claim 1, the method comprising:
determining, by the instruction variant selection logic of the processor, which instruction variant to execute.

3. The method of claim 2, wherein the instruction variant selection logic chooses an instruction variant out of a plurality of variants of a convert operation instruction or a multiply operation.

4. The method of claim 3, wherein the plurality of variants comprises a first instruction variant and a second instruction variant, the first instruction variant having a larger execution length and power impact than an execution length and power impact of the second instruction variant.

5. The method of claim 1, wherein an internal state of the processor is compared against a compare value by the instruction variant selection logic to select the preferred instruction variant.

6. The method of claim 1, the method comprising:
executing, by the execution unit of the processor, a correct instruction variant when the instruction variant selection logic of the processor determines that the preferred instruction variant was incorrect.

7. A computer program product comprising a computer readable storage medium having program instructions embodied therewith, the program instructions executable by a processor to cause:
receiving, by an instruction issue unit of the processor as input, a preferred instruction variant from instruction variant selection logic of the processor;
executing, by an execution unit of the processor, the preferred instruction variant;
providing, by the execution unit of the processor, a quality feedback to the instruction variant selection logic;
evaluating, by the instruction variant selection logic, a quality of the preferred instruction variant based on the quality feedback.

8. The computer program product of claim 7, wherein the program instructions are further executable by the processor to cause:
determining, by the instruction variant selection logic of the processor, which instruction variant to execute.

9. The computer program product of claim 8, wherein the instruction variant selection logic chooses an instruction variant out of a plurality of variants of a convert operation instruction or a multiply operation.

10. The computer program product of claim 9, wherein the plurality of variants comprises a first instruction variant and a second instruction variant, the first instruction variant having a larger execution length and power impact than an execution length and power impact of the second instruction variant.

11. The computer program product of claim 7, wherein an internal state of the processor is compared against a compare value by the instruction variant selection logic to select the preferred instruction variant.

12. The computer program product of claim 7, wherein the program instructions are further executable by the processor to cause:
executing, by the execution unit of the processor, a correct instruction variant when the instruction variant selection logic of the processor determines that the preferred instruction variant was incorrect.

13. A system, comprising a processor and a memory storing program instructions thereon, the program instructions executable by the processor to cause:
receiving, by an instruction issue unit of the processor as input, a preferred instruction variant from instruction variant selection logic of the processor;
executing, by an execution unit of the processor, the preferred instruction variant;
providing, by the execution unit of the processor, a quality feedback to the instruction variant selection logic; and
evaluating, by the instruction variant selection logic, a quality of the preferred instruction variant based on the quality feedback.

14. The system of claim 13, wherein the program instructions are further executable by the processor to cause:
determining, by the instruction variant selection logic of the processor, which instruction variant to execute.

15. The system of claim 14, wherein the instruction variant selection logic chooses an instruction variant out of a plurality of variants of a convert operation instruction or a multiply operation.

16. The system of claim 15, wherein the plurality of variants comprises a first instruction variant and a second instruction variant, the first instruction variant having a larger execution length and power impact than an execution length and power impact of the second instruction variant.

17. The system of claim 13, wherein an internal state of the processor is compared against a compare value by the instruction variant selection logic to select the preferred instruction variant.

18. The system of claim 13, wherein the program instructions are further executable by the processor to cause:
executing, by the execution unit of the processor, a correct instruction variant when the instruction variant selection logic of the processor determines that the preferred instruction variant was incorrect.

* * * * *